No. 12,799. REISSUED MAY 26, 1908.

T. ANDREWS.

TUBE CLEANER.

APPLICATION FILED FEB. 28, 1907.

Witnesses:
Chas. D. King.
Charles A. Scheuber.

Thomas Andrews
Inventor:
by Dunn, Turk & Clarke
Attys.

UNITED STATES PATENT OFFICE.

THOMAS ANDREWS, OF ROCKAWAY, NEW JERSEY, ASSIGNOR TO THOMAS ANDREWS MANUFACTURING COMPANY, A CORPORATION OF NEW JERSEY

TUBE-CLEANER.

No. 12,799. Specification of Reissued Letters Patent. Reissued May 26, 1908.

Original No. 828,173, dated August 7, 1906, Serial No. 295,736. Application for reissue filed February 28, 1907. Serial No. 359,947.

*To all whom it may concern:*

Be it known that I, THOMAS ANDREWS, a citizen of the United States, residing in Rockaway, county of Morris, and State of New Jersey, have invented certain new and useful Improvements in Tube-Cleaners, of which the following is a full, clear, and exact specification.

This invention relates to tube cleaners.

The objects of the invention are to improve and simplify the construction of such devices; furthermore, to increase their efficiency in operation, and to decrease the expense attending their manufacture.

The invention resides in the combination and arrangement of parts and in the details of construction hereinafter claimed, it being understood that changes in the precise embodiment of invention herein disclosed can be made within the scope of the following claims without departing from the spirit of the invention.

Figure 1:
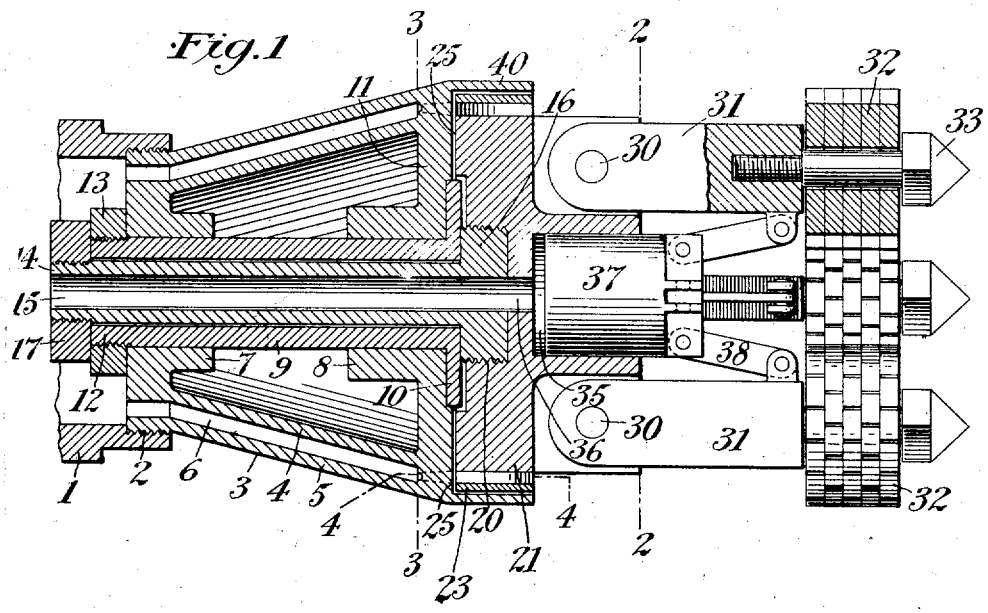
Figure 2:
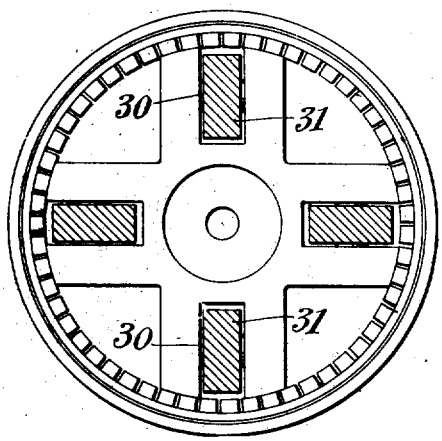
Figure 3:
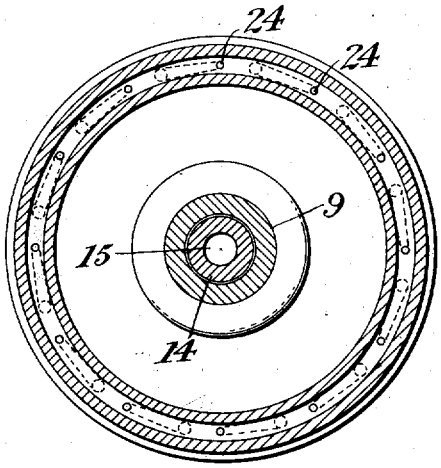
Figure 4:
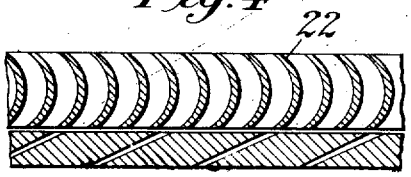

In the accompanying drawing forming part of this specification Figure 1 is a longitudinal section, partly in elevation, through a tube cleaner constructed in accordance with the invention. Fig. 2 is a transverse section on the line 2—2 of Fig. 1. Fig. 3 is a similar section on the line 3—3 of Fig. 1. Fig. 4 is a section on the line 4—4 of Fig. 1.

Like reference numerals indicate corresponding parts in the different figures of the drawings.

The reference numeral 1 indicates a fluid chamber, which may be of any suitable form and construction and is adapted to be connected with any suitable source of fluid supply. Threaded into or otherwise connected with the fluid chamber 1, as indicated at 2, is a head which is designated generally by 3. The head 3 preferably is frusto-conical in shape and is formed with an inner wall 4, which preferably is annular in cross-section and is flared from one end to the other, and an outer wall 5, which is parallel to the inner wall 4, and similarly shaped. The inner and outer walls 4 and 5 are separated from each other so as to provide a fluid passage 6, which communicates with the fluid chamber 1 and receives the fluid therefrom. The head 3 is provided with end bearings 7 and 8, the bearing 8 being at the inner end of the device, and the bearing 7 at the outer end thereof. Extending through the bearings 7 and 8 is a long, removable bushing 9, which is provided at its inner end with an integral flange or thrust-receiving member 10, which rests against the inner end 11 of the head and is partially seated in a shallow recess formed in said inner end 11. The opposite end of the long bushing 9 extends outward beyond the bearing 7 of the head, as indicated at 12, and is provided with a washer or thrust-receiving member 13, which is threaded on to or otherwise removably connected with the outer end of the bushing 9. Extending through the bushing 9 is a shaft 14, which is formed with a longitudinally-extending passage 15, so as to make it hollow. At its inner end the hollow shaft 14 is formed with an integral thrust-receiving member 16, which is in contact with the integral thrust-receiving member 10 on the inner end of the bushing 9. At its outer end the hollow shaft 14 is provided with a nut or thrust-receiving member 17, which is threaded on to or otherwise suitably connected with the shaft 14 so as to be removable therefrom.

It will be noted that when the tube cleaner is being forced into a boiler tube having a heavy scale so that the thrust on the shaft 14 is in an outward direction, said thrust will be taken up by the thrust-receiving members 10 and 16, and when the tube cleaner is either removed from the boiler tube or else encounters no resistance, so that the fluid passing through the fluid passage 6 and striking the turbine causes the thrust on the shaft 14 to be in the opposite direction, said thrust is taken up by the thrust-receiving members 13 and 17, as well as by the thrust-receiving portion 12 of the bushing 9, it being understood that the thrust-receiving member 17, as shown clearly in Fig. 1, is adapted to contact both with the end portion 12 of the bushing 9, and with the thrust-receiving member 13. In the event that either the bushing 9 or the shaft 14, or both, should become worn, these parts can be removed and replaced by taking off the thrust-receiving members 13 and 17, as will be obvious.

Detachably connected in any suitable manner, such as by screw threads 20, with the inner end shaft 14, so as to cover the same, is a turbine 21 having turbine blades 22, as shown in Fig. 4, around which blades is shrunk a metal band 23. As shown in Fig.

1, the inner end or thrust-receiving member 16 of the shaft 14 is threaded into a suitable socket in the turbine 21. For the purpose of causing the motive fluid from the chamber 1 and flaring fluid passage 6 to impinge against the blades 22, a number of inclined fluid passages 24 are cut through the inner end 11 of the head 3, as shown clearly in Figs. 1 and 3 of the drawing. The turbine 21 preferably is out of frictional contact with the end 11 of the head 3, as indicated at 25, for which reason there will be no friction or wear between the turbine 21 and the end 11 during the rotation of the turbine; but on the contrary, all the friction or wear will be taken up by the thrust-receiving members 10, 16, 12, 13, and 17, together with the shaft 14 and bushing 9, all of which parts can be readily replaced when worn, as previously described.

Pivotally connected in any suitable manner with the turbine 21, as indicated at 30, is a plurality of swinging arms, with each of which swinging arms is connected a plurality of cutting devices or disks 32, the disks 32 being secured on the swinging arms 31 preferably by means of bolts 33, threaded into the arms 31 and being readily removable, so that when the innermost disks 32 become worn, they can be shifted upon the bolts 33 so as to bring unworn disks into position on the inner ends of said bolts 33.

In tube cleaners as generally constructed, it is customary to rely upon centrifugal force for throwing the arms 31 outwardly to bring the disks 32 into cutting position. It is one of the objects of my invention to provide fluid-operated means for positively throwing the disks or cutting devices 32 into position. For the purpose of providing such fluid-operated means, the turbine 21 is formed with an expansion chamber 35, which communicates through a passage 36 with the hollow shaft 14. Slidably mounted in the expansion chamber 35 is a piston 37, which is suitably connected by means, such as links 38, with the swinging arms 31. The turbine 21 is preferably housed within a tubular extension 40 formed on the inner end of the head 3.

When the device is in operation, it will be obvious that fluid, such as water, steam, and the like, passing outward through the flaring annular fluid passage 6, will strike and rotate the turbine 21. At the same time the fluid will pass through the hollow shaft 14, and will move the piston 37 inward so as positively to expand the arms 31, and thus throw the cutting devices 32 into position.

In tube cleaners as generally constructed, a very short bearing is provided for the shaft 14. As practically all the strain of the rotating cutting devices falls upon the shaft 14, a short shaft will become readily worn and will soon wabble in its bearing. In my device, on the contrary, I provide a shaft 14 and a bushing 9 which are of approximately the same length as the distance from the outer face of the turbine 21 to the innermost cutting disk 32, whereby the shaft 14 has a long bearing to support the lateral strains which fall thereon, and the strength of the tube cleaner is therefore materially increased.

The improved device is strong, simple, durable, and inexpensive in construction, as well as thoroughly efficient in operation.

Matter shown and described herein and not specifically claimed is reserved, being claimed in copending application Serial Number 363,092, bearing date of March 18, 1907.

What is claimed is:

1. A tube cleaner comprising a head, a hollow shaft rotatably mounted in said head, a turbine connected with said hollow shaft, a cylinder rotatable with said shaft and turbine and communicating with said hollow shaft, a piston in said cylinder, cleaning devices pivotally connected with said cylinder, and links connecting said cleaning devices with said piston.

2. A tube cleaner comprising a head having a chamber for receiving a motive agent, and also having an inner chamber communicating with the first-named chamber, a tubular shaft extended through the head, a turbine mounted on said shaft within the inner chamber, a cylinder on the turbine, with which the tubular shaft communicates, a piston in the cylinder, tool-carrying arms mounted to swing on the turbine, and link connections between said arms and said piston.

3. A tube cleaner comprising a head having a chamber for receiving motive agent, and also having a chamber at its inner end communicating with the first-named chamber, a bushing extended through the head, a tubular shaft arranged to rotate in said bushing, a turbine attached to the tubular shaft within the inner tubular chamber, a cylinder on the turbine with which the tubular shaft communicates, a piston in the cylinder, arms mounted to swing on the turbine, tools carried by said arms, and link connections between said arms and the piston.

4. A tube cleaner comprising a head substantially in the form of a truncated cone, and having a chamber for receiving motive agent, and also having a chamber at its inner end communicating through ports with said first-mentioned chamber, a turbine mounted to rotate in the inner chamber, blades on the periphery of said turbine having a spiral trend, a collar engaging around the blades, tool-carrying arms mounted on the turbine and a pressure-actuated piston having connection with the said arms.

5. A tube cleaner having a head, a hollow shaft mounted in said head, cleaning devices connected with said shaft, and fluid-operated means movable longitudinally of the tube cleaner and carried by said shaft for positively throwing said cleaning devices into position.

6. A tube cleaner comprising a head, a turbine having rotary connection with the head, a cylinder formed integral with the turbine, a piston in said cylinder, pairs of lugs also formed integral with the turbine, cleaning devices pivotally connected with the lugs, and links connecting said cleaning devices with said piston.

7. A device of the character described including a body having a passage formed therein to receive a fluid under pressure and also provided with a compartment at one end thereof communicating with said passage, a shaft mounted in said body, a driving head carried by said shaft and mounted in said compartment, means formed on the periphery of said head adapted to receive said fluid and cause the rotation of said shaft and head, said driving head having a chamber formed therein, a piston head mounted in said chamber, a plurality of pivotally mounted arms carried by said head and piston head, a plurality of cutters carried by said arms, said shaft having an opening therein communicating with a fluid supply and said chamber, said piston head being actuated to cause said arms and cutters to swing outwardly and engage the inner wall of a tube.

8. A device of the character described including a rotary head, a plurality of arms pivotally mounted on said head, a longitudinally moving plunger provided with means adapted to receive a plurality of supporting arms, a plurality of cutters mounted on said arms, and means formed on said arms adapted to hold said cutters in place on said arms.

In testimony whereof, I have hereunto set my hand in the presence of subscribing witnesses.

THOMAS ANDREWS.

Witnesses:
E. BERTRAM MOTT,
VANDERE F. MOTT,
M. D. JONES.